United States Patent
Soriano, Jr. et al.

(10) Patent No.: US 10,941,366 B2
(45) Date of Patent: Mar. 9, 2021

(54) CLOUD POINT DEPRESSANT FOR MIDDLE DISTILLATE FUELS

(71) Applicant: ECOLAB USA INC., St. Paul, MN (US)

(72) Inventors: Nestor Soriano, Jr., Missouri City, TX (US); Ravindranath Mukkamala, Sugar Land, TX (US)

(73) Assignee: Ecolab USA Inc., St. Paul, MN (US)

( * ) Notice: Subject to any disclaimer, the term of this patent is extended or adjusted under 35 U.S.C. 154(b) by 39 days.

(21) Appl. No.: 16/233,318

(22) Filed: Dec. 27, 2018

(65) Prior Publication Data
US 2019/0203135 A1    Jul. 4, 2019

Related U.S. Application Data

(60) Provisional application No. 62/611,229, filed on Dec. 28, 2017.

(51) Int. Cl.
| | | |
|---|---|---|
| *C10L 10/16* | (2006.01) | |
| *C10L 1/236* | (2006.01) | |
| *C10L 1/222* | (2006.01) | |
| *C10L 10/14* | (2006.01) | |

(52) U.S. Cl.
CPC .......... *C10L 10/16* (2013.01); *C10L 1/236* (2013.01); *C10L 1/2364* (2013.01); *C10L 1/2366* (2013.01); *C10L 1/2222* (2013.01); *C10L 10/14* (2013.01); *C10L 2200/04* (2013.01); *C10L 2200/0438* (2013.01); *C10L 2200/0476* (2013.01); *C10L 2230/086* (2013.01); *C10L 2270/026* (2013.01)

(58) Field of Classification Search
CPC combination set(s) only.
See application file for complete search history.

(56) References Cited

U.S. PATENT DOCUMENTS

| | | | |
|---|---|---|---|
| 4,121,026 A | 10/1978 | Cheng et al. | |
| 4,211,534 A | 7/1980 | Feldman | |
| 4,731,095 A * | 3/1988 | Garapon | C08F 8/32 44/346 |
| 4,900,331 A | 2/1990 | Le | |
| 4,900,332 A | 2/1990 | Denis et al. | |
| 5,441,545 A | 8/1995 | Lewtas et al. | |
| 5,707,943 A | 1/1998 | Covitch | |
| 5,851,429 A | 12/1998 | Magyar | |
| 6,143,043 A | 11/2000 | Botros | |
| 7,041,738 B2 | 5/2006 | Krull et al. | |
| 2002/0040546 A1 | 4/2002 | Botros | |
| 2003/0104943 A1* | 6/2003 | Lennon | A01N 25/30 504/206 |
| 2003/0166811 A1 | 9/2003 | Peiffer et al. | |
| 2005/0050792 A1 | 3/2005 | Corkwell et al. | |
| 2005/0086855 A1 | 4/2005 | Tack et al. | |
| 2007/0161519 A1 | 7/2007 | Cravey et al. | |
| 2012/0264662 A1 | 10/2012 | DiBiase et al. | |
| 2013/0025189 A1* | 1/2013 | Burgazli | C10L 10/14 44/307 |
| 2015/0113859 A1 | 4/2015 | Voelkel et al. | |
| 2015/0113867 A1 | 4/2015 | Voelkel et al. | |
| 2015/0284495 A1 | 10/2015 | Reed et al. | |
| 2016/0115369 A1 | 4/2016 | Soriano, Jr. et al. | |
| 2016/0257879 A1 | 9/2016 | Huang et al. | |
| 2017/0130153 A1 | 5/2017 | Peretolchin et al. | |
| 2018/0086862 A1 | 3/2018 | Kundu et al. | |
| 2018/0025169 A1 | 9/2018 | Mezger et al. | |
| 2020/0017786 A1 | 1/2020 | Li et al. | |

FOREIGN PATENT DOCUMENTS

| | | |
|---|---|---|
| AU | 201235167 A1 | 7/2014 |
| EP | 1380635 A2 | 1/2004 |
| WO | 2013087701 A1 | 6/2013 |
| WO | 2017/009208 A1 | 1/2017 |

OTHER PUBLICATIONS

Ke-Dian et al., "A study on three kinds of alcohols esterified copolymer of maleic anhydride and olefins as pour-point depressant for diesels", Petroleum Science and Technology, vol. 16, Issue No. 9-10, Oct.-Nov. 1998, pp. 971-977.

Mariella et al., "A Novel SN1 Displacement: The Reaction of Tertiary Amines with Acetic Anhydride", Department of Chemistry, Loyola University, Chicago, Illinois, Sep. 3, 1970, pp. 3348-3351.

Pasguali et al., "Some considerations about the hydrophilic—lipophilic balance system", International Journal of Pharmaceutics, vol. 356, Issue Nos. 1-2, May 22, 2008, pp. 44-51.

International Search Report for Application No. PCT/US2018/067597, dated Mar. 20, 2019, 6 pages.

Written Opinion for Application No. PCT/US2018/067597, dated Mar. 20, 2019, 9 pages.

* cited by examiner

*Primary Examiner* — Ellen M McAvoy
*Assistant Examiner* — Chantel L Graham
(74) *Attorney, Agent, or Firm* — Kagan Binder, PLLC (57) ABSTRACT

Disclosed are cloud point depressants and methods of making and using them. The disclosed cloud point depressants comprise copolymers of a maleic moiety polymerized with alpha olefins and then contacted with an aliphatic tertiary amine to provide a cloud depressant reaction product. When the disclosed reactions products are added to middle distillate fuels or blends of middle distillate fuels with biodiesel, the cloud point depressants inhibit the precipitation of waxes and/or biowaxes in the fuels and the fuels exhibit reduced precipitation, gelling, and/or crystallization when subjected to low or cold temperatures.

20 Claims, 5 Drawing Sheets

CLOUD POINT DEPRESSANT FOR MIDDLE DISTILLATE FUELS

CROSS-REFERENCE TO RELATED APPLICATIONS

This application claims the benefit of U.S. Provisional Application Ser. No. 62/611,229, filed Dec. 28, 2017, entitled "CLOUD POINT DEPRESSANT FOR MIDDLE DISTILLATE FUELS", the entire disclosure of which is incorporated herein by reference.

BACKGROUND

In the petroleum industry, cloud point refers to the temperature below which wax in middle distillate fuels as well as wax and biowax in middle distillate fuels blended with biodiesel start to come out of solution and imparts certain degree of cloudiness or haziness to the fuels or fuels blended with biodiesel. The wax and biowax in these fuels can form a cloudy appearance at low and cold operating temperatures. The presence of solidified waxes thickens the fuel and may clog fuel filters and injectors in diesel engines. The waxes also accumulate on cold surfaces (producing, for example, pipeline or heat exchanger fouling) and form an emulsion with water. Therefore, cloud point indicates the tendency of the fuel to plug filters or small orifices at cold operating temperatures.

Cloud point depressants (CPD) have been used for many years in middle distillate fuels such as, for example, low-sulfur diesel fuels. Custom-designed, specialty polymer chemistry has enabled refiners to meet cloud point (CP) guidelines while using substantially less kerosene to meet similar levels. These polymers allow greater refined yields through cut-point adjustment upgrades and the potential for diverting kerosene to other opportunities such as, for example, jet fuel. The practice of cut-point downgrades to gas oil can be costly because diesel fuel generally has greater value. Kerosene dilutions have historically been as high as 30%-40% by volume with low-sulfur diesel fuels. While kerosene addition enables fuels to reach CP guidelines, it may negatively impact the fuel's energy content, cetane number, lubricity, flash point and density. Properly designed CPD are able to substantially reduce or even eliminate the need for kerosene, thus substantially reducing refinery costs.

With ultra-low-sulfur diesel fuels (ULSD), for example, being mandated throughout the mass market distribution system, the need for CP control is high. However, waxy crude oil and process limitations may make it difficult for refiners to economically make middle distillate fuels or blends of these fuels with biodiesel with a low cloud point. Fortunately, CPD can overcome these limitations without negatively impacting fuel characteristics. CPD allow refiners to meet low-temperature objectives while being neutral or beneficial to most other fuel properties.

SUMMARY

This disclosure provides a cloud point depressant for distillate fuels comprising a reaction product of i) a copolymer of an alpha olefin and an unsaturated monomer, and ii) a tertiary amine.

In some embodiments the alpha olefin may be a $C_8$-$C_{30}$ alpha olefin or mixtures thereof. The unsaturated monomer may be maleic-based, maleamide-based, or maleimide-based monomer, and the tertiary amine may be a dimethyl fatty acid amine or mixtures thereof.

In other embodiments the alpha olefin is a mixture of $C_{20}$-$C_{24}$ alpha olefins, the monomer is maleic anhydride, and the tertiary amine is N,N-dimethylcocoamine.

In other embodiments the alpha olefin may be an one or more alpha olefins selected from the group consisting of an alpha olefin of formula (I)

wherein $R_1$ is $C_{10}$-$C_{14}$ alkyl; or
an alpha olefin of formula (II)

wherein $R_2$ is $C_{15}$-$C_{19}$ alkyl;
an alpha olefin of the formula (III)

wherein $R_3$ is $C_{20}$-$C_{30}$ alkyl; and combinations thereof.

In still other embodiments, the unsaturated monomer may be a one or more monomers selected from the group consisting of a monomer of formula (IV)

wherein $R_1$ is hydrogen or $C_1$-$C_{12}$ alkyl; or
a monomer of formula (V)

wherein R1 is hydrogen or $C_1$-$C_{12}$ alkyl and $R_2$ and $R_3$ are the same or different and are $C_1$-$C_{18}$ alkyl; or
a monomer of formula (VI)

wherein $R_1$ is hydrogen or $C_1$-$C_{12}$ alkyl $R_4$ is $C_1$-$C_{12}$ alkyl, $C_6$-$C_{12}$ aryl, or $C_6$-$C_{20}$ alkaryl; and combinations thereof.

In still other embodiments the unsaturated monomer may be a maleic moiety such as, for example, maleic anhydride, maleic acid, maleimide and N-alkyl, N-aryl, and N-alkaryl maleimides. Other suitable unsaturated monomers may be a substituted moiety such as citraconic anhydride, citraconimide and N-alkyl, N-aryl, and N-alkaryl citraconimides. Still other suitable unsaturated monomers may be combinations of, for example, maleic anhydride and citraconic anhydride.

In other embodiments, the tertiary amine may be an amine having the formula (VII)

wherein $R_5$, $R_6$, and $R_7$ are the same or different and are $C_1$-$C_{30}$ alkyl or the tertiary amine may be an amine having the formula (VIII)

wherein $R_8$, $R_9$, and $R_{10}$ are the same or different and are $C_1$-$C_{18}$ alkyl.

The disclosure also provides a cloud point depressant comprising the reaction product of i) a copolymer of an alpha olefin and an unsaturated monomer, and ii) a tertiary amine; an organic solvent; and optionally a demulsifier. A suitable organic solvent may include one or more of $C_1$-$C_{12}$ alkyl ethers, $C_5$-$C_{18}$ linear alkanes, $C_5$-$C_{18}$ branched alkanes, $C_5$-$C_8$ cycloalkanes, toluene, o-xylene, m-xylene, p-xylene, refined petroleum solvent, ethylene glycol methyl butyl ether, or any combination thereof.

Suitable demulsifiers may include hydrophilic or water-soluble surfactant with a hydrophilic-lipophilic balance (HLB) value equal to or greater than about 8. See, for example, C Pasquali, Ricardo & P Taurozzi, Melina & Bregni, Carlos. (2008). Some considerations about the hydrophilic-lipophilic balance system. International Journal of Pharmaceutics. 356. 44-51. 10.1016/j.ijpharm.2007.12.034.

Also disclosed is a fuel composition comprising any one or more of the disclosed cloud point depressants, a hydrocarbon-based fuel such as diesel or diesel blended with biodiesel, a solvent and a demulsifier.

Also disclosed is a method comprising applying any of the disclosed cloud point depressants to a fuel composition.

Also disclosed is a method comprising subjecting any of the disclosed cloud point suppressants in a middle distillate fuel or blends of middle distillate fuel and biodiesel to a temperature of between 4° C. and −60° C. without perceptible cloud point.

Also disclosed is a use of any of the disclosed cloud point suppressants in a middle distillate fuel or blends of middle distillate fuel and biodiesel to inhibit the precipitation of components in the fuel. In embodiments, this use includes subjecting such fuels to a temperature of between 4° C. and −60° C.

Additional advantages and novel features of the invention will be set forth in part in the description that follows, and in part will become apparent to those skilled in the art upon examination of the following, or may be learned through routine experimentation upon practice of the invention.

DETAILED DESCRIPTION

Although the present disclosure provides different embodiments, persons skilled in the art will recognize that changes may be made in form and detail without departing from the spirit and scope of disclosed embodiments. Various embodiments may be described in detail with reference to related figures. The disclosed embodiments do not limit the scope of the attached claims. Additionally, any disclosed examples are not intended to be limiting and merely provide some of the many possible embodiments for the claims.

Unless otherwise defined, all technical and scientific terms have the same meaning as commonly understood by one of ordinary skill in the art. In case of conflict, the present document, including definitions, controls. Preferred methods and materials are described below, although methods and materials similar or equivalent to those described may be used in practice or testing of the disclosed embodiments. All publications, patent applications, patents and other references mentioned herein are incorporated by reference in their entirety. The materials, methods, and examples disclosed herein are illustrative only and not intended to be limiting.

Any recited ranges of values contemplate all values within the range and are to be construed as support for claims reciting any sub-ranges having endpoints which are real number values within the recited range. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

Definitions

The term "about" modifying, for example, the quantity of an ingredient in a composition, concentration, volume, process temperature, process time, yield, flow rate, pressure, and like values, and ranges thereof, employed in describing the embodiments of the disclosure, means variations in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the appended include equivalents to these quantities. Further, where "about" is used describe a range of values, for example "about 1-5" the recitation means "1-5" and "about 1 to about 5" and "1 to about 5" and "about 1 to 5" unless specifically limited by context.

The term "cloud point" (CP) means the first appearance of haze in a fuel, such as diesel fuel, due to wax crystal formation under prescribed cooling conditions. CP may be measured, for example, manually according to ASTM Method D2500 ASTM Standard D2500, Standard Test Method for Cloud Point in Petroleum Products, West Conshohocken, Pa.: ASTM International, 1999 (2011), but there are a number of automated methods that correlate to D2500 such as, for example, ASTM Standard D5773, Standard Test Method for Cloud Point of Petroleum Products (Constant Cooling Rate Method), West Conshohocken, Pa.: ASTM International. The presence of wax crystals thickens the fuel and may clog fuel filters and injectors in diesel engines. The wax also accumulates on cold surfaces and forms an emulsion with water. An everyday example of cloud point can be seen in olive oil stored in cold weather. Olive oil begins to solidify at around 4° C. (winter temperatures in temperate countries can often be colder than 0° C.). In these conditions, olive oil begins to develop white, waxy clumps of solidified oil that sink to the bottom of the container.

The term "cloud point depressant (CPD)" means a reaction product that inhibits wax precipitation, crystallization and/or gelling from fuel, and is generally applicable for diesel fuels that are Grade No. 2; a blend of Grade No. 2 and Grade No. 1; and diesel/biodiesel blends.

The terms "comprise(s)", "include(s)", "having", "has", "can", "contain(s)", and variants thereof are open-ended transitional phrases, terms, or words that do not preclude the possibility of additional acts or structures. The singular forms "a", "and", and "the" may include plural references unless the context clearly dictates otherwise. The present disclosure also contemplates other embodiments "comprising", "consisting of", and "consisting essentially of", the disclosed embodiments or elements, whether explicitly set forth or not. Further, the phrase "consisting essentially of" includes the effect of this transitional phrase to leave the claim open in order to include additional elements, but only if those additional elements do not materially affect the basic and novel characteristics of the claimed features.

The terms "copolymer", "copolymerize" include not only polymers comprising two monomer residues and polymerization of two different monomers together respectively, but also includes copolymers comprising more than two monomer residues and polymerizing together more than two or more other monomers. Therefore the term copolymer, for example, includes terpolymer; quadrapolymer; and polymers made from more than four different monomers, and/or polymers comprising, consisting of, or consisting essentially of more than three different monomer residues.

The terms, "maleic moieties" includes maleic anhydride, maleic acid, maleamides, maleimide and N-alkyl, N-aryl, and N-alkaryl maleimides. "Maleic moieties" also includes substituted maleic moieties such as citraconic anhydride, citraconimide and N-alkyl, N-aryl, and N-alkaryl citraconimides.

The terms "middle distillate fuels" and "middle distillate fuels blended with biodiesel fuel" generally means a material that is liquid at 20° C. and one atmosphere pressure that can be made to react with oxygen so that it releases chemical energy as heat and/or to be used for work. Specifically, middle distillate fuel falls under the Grade No. 2-D for use in diesel engine applications with varying sulfur requirements (15 ppm sulfur maximum (S15)); 500 ppm sulfur maximum (S500); and 5000 ppm sulfur maximum (S5000). As per ASTM D975 standard, Grade No. 2 diesel fuel oils exhibit 90% distillation recovered temperatures (per ASTM D 86 test) of 282° C. (minimum) to 338° C. (maximum) and kinematic viscosity at 40° C. of 1.9 to 4.1 cSt. When a cloud point less than −12° C. is specified, as can occur during cold months, it is permitted and normal blending practice to combine Grade No. 2 with Grade No. 1 to meet the low temperature requirements. In that case the minimum viscosity at 40° C. shall be 1.7 cSt and the minimum 90% distillation recovered temperature shall be waived.

The term "OMAC" means an olefin/maleic anhydride copolymer and also includes copolymers of olefins and maleic anhydride derivatives such as, for example, nadic anhydride, citraconic anhydride, and other related anhydrides.

The terms "optional" or "optionally" mean subsequently described events or circumstances that may, but need not, occur, and that the description includes instances where the event or circumstance occurs and instances in which it does not.

The terms "significant" or "significantly" mean at least half, or 50%, by some measure as defined or as determined by context. For example, a solution that contains a "significant amount" of a component contains 50% or more of that component by weight, or by volume, or by some other measure as appropriate and in context. A solution having a component significantly removed has had at least 50% of the original amount of that component removed by weight, or by volume, or by some other measure as appropriate and in context.

The phrase "subjecting" a material "to a temperature of" means "conveying the material to a location wherein the material loses heat and the temperature of the material drops to a desired or predetermined temperature.

Olefins and Maleic Moieties

One class of copolymers or comb polymers which are effective as cloud point depressants comprises copolymers of maleic anhydride, maleamides, and maleimide with alpha olefins. U.S. Pat. No. 6,143,043 reports, for example, maleic anhydride/alpha olefin copolymers and maleimide/alpha olefin copolymers and is incorporated by reference in its entirety herein.

Suitable olefins impart side chains to the resulting polymer and are olefins with one double bond, since when polymerized olefins comprising one double bond per molecule do not usually form crosslinked networks. If the olefin is linear and/or contains linear hydrocarbon chains such as alkyl or alkaryl chains attached to the double bond, then polymers of the olefin including copolymers of the olefin have pendant side chains. For example, polymers of linear alpha olefins having 14 carbon atoms or more, when polymerized and/or copolymerized, impart linear side chains of 12 carbon atoms or more to the resulting polymer. Long-chain alkenes, wherein the double bond is not in the 1-position, are also suitable because when polymerized the resulting polymer of the alkene monomer has linear side chains of at least 12 carbon atoms. Polymers of long chain alkenes with 12 carbon atoms or more on one side of the double bond and 12 carbon atoms or more on the opposing side of the double bond, when polymerized and/or copolymerized, form brush polymers. Such brush polymers have sets of opposing pendant side chains. Both brush and comb polymers are both useful in the disclosed embodiments.

Copolymers of maleic moieties with two or more olefins are disclosed, where the two or more olefins each furnishes to the resulting copolymer linear hydrocarbon sidechains of longer than 10 carbon atoms, the copolymers being effective as cloud point depressants when added to fuel, such as distillate fuels including diesel and biodiesel fuels. In further embodiments, the maleic moiety itself furnishes a further side chain of more than 10 carbons in length such as n-decyl: such maleic moieties include N-alkyl maleimides, wherein the alkyl group is n-alkyl having 12 carbon atoms or greater. In one embodiment, the maleic moiety is N-(n-octadecyl) maleimide.

Some embodiments provide a copolymer having at least three n-alkyl pendant chains having at least 10 carbon atoms, the copolymer comprising the residues of at least one maleic moiety having at least one maleic n-alkyl chain of at least 10 carbon atoms and the residue of at least two olefins comprising olefin n-alkyl chains having at least 10 carbon atoms. Each of the residues of the two or more olefins comprises a linear alkyl side-chain of 12 or more carbon atoms. At least two of the residues of the two or more olefins comprising a linear alkyl side-chain of 12 or more carbon atoms two or more olefins comprise linear alkyl side chains having chains each comprising at least 12 carbon atoms. In embodiments, the copolymer comprises, consists of, or consists essentially of the residues of one maleic moiety and two olefins. In embodiments, one or both of the two olefins is an alpha olefin. In embodiments, the maleic moiety is a maleimide. In embodiments, the monomer is an N-alkyl maleimide, wherein the alkyl group has more than 12 carbon atoms. In embodiments, the alkyl group is n-octadecyl. In embodiments, the long-chain carboxylic acid is a carboxylic acid having 12 carbon atoms or greater. In embodiments, the carboxylic acid is an n-alkyl carboxylic acid having 21 atoms or greater.

Tertiary Amines

In some embodiments, the tertiary amine comprises an amine having the formula, $N(R_5)(R_6)(R_7)$, wherein $R_5$, $R_6$, and $R_7$ are the same or different and are $C_1$-$C_{30}$ alkyl. In other embodiments, the tertiary amine comprises an amine having the formula, $N(R_8)(R_9)(R_{10})$, wherein $R_8$, $R_9$, and $R_{10}$ are the same or different and are $C_1$-$C_{18}$ alkyl. In still other embodiments, the tertiary amine comprises a dimethyl fatty acid amine or mixtures thereof. An exemplary tertiary amine is N,N-dimethylcocoamine.

Solvents

In embodiments, the cloud point depressant further comprises one or more hydrocarbon-based solvents. In embodiments, the solvent may be selected from alcohols, amides, sulfoxides, aldehydes, ketones, esters, or ethers. In embodiments, the solvent may be alicyclic or cyclic. In embodiments, the solvent may be aromatic. In other embodiments, the solvent may be selected from $C_1$-$C_{12}$ alkyl ethers, $C_1$-$C_{12}$ alcohols, $C_5$-$C_{18}$ linear alkanes, $C_5$-$C_{18}$ branched alkanes, $C_5$-C8 cycloalkanes, toluene, o-xylene, m-xylene, p-xylene, refined petroleum solvent, ethylene glycol methyl butyl ether or any combination thereof.

Demulsifiers

In embodiments, a suitable demulsifier comprises a hydrophilic or water-soluble surfactant with a hydrophilic-lipophilic balance (HLB) values ≥about 8. An exemplary emulsifier is Nalco Champion EC2043A (Nalco Champion an Ecolab Company, St. Paul, Minn.).

Other Embodiments

The disclosed cloud point depressant provides improved low temperature stability when added fuel that are low. The disclosed cloud point depressant inhibits wax precipitation, crystallization and/or gelling from the fuel.

In embodiments, the number average molecular weight of the cloud point depressant of any of the disclosed embodiments from about 10000-1500000, about 2000-500000, about 3000-100000, or about 4000-50000. In embodiments, the number average molecular weight of the cloud point depressant is from about 1000-20000, about 1000-15000, or about 1000-10000.

In embodiments, the disclosed cloud point depressant is present in a composition at a concentration in a range of about 30-75 wt %.

Other embodiments are a method that comprises, consists of, or consists essentially of subjecting a fuel composition comprising a disclosed cloud point depressant to a cold temperature.

Figure 1:
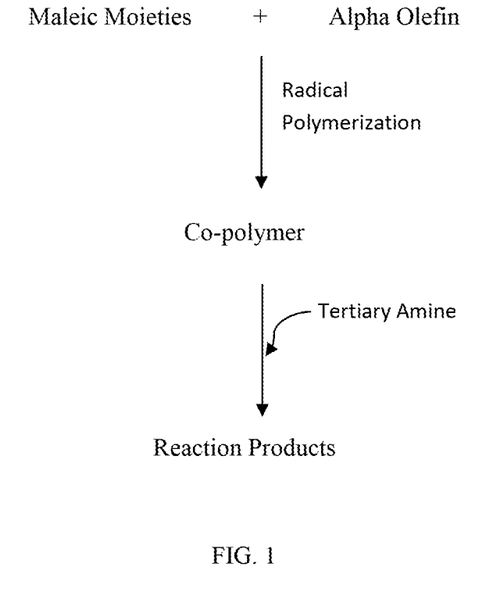
FIG. 1 illustrates a reaction scheme for the synthesis of the reaction product of an alpha olefin/maleic anhydride copolymer and a tertiary amine.

FIG. 1 illustrates a reaction scheme that provides the disclosed cloud point depressant. In first step, substantially equimolar amounts of a suitable alpha olefin and suitable maleic moiety are charged to a reactor under an inert atmosphere and heated to provide a homogeneous mixture. The homogeneous mixture is heated to a desired reaction temperature with mixing and then a suitable catalyst is added portion-wise to the mixture to initiate the copolymerization reaction.

In a second step, the alpha olefin/malic moiety copolymer is heated to a desired temperature, and a substantially an equimolar amount (based on the amount of maleic moiety used in the first step) of a suitable tertiary amine is added portion-wise to the heated copolymer to form a reaction product. The tertiary amine may be added with or without a suitable catalyst.

The alpha olefin/maleic moiety/tertiary amine reaction product formed in the second step is then mixed with a suitable solvent, and optionally a demulsifier, to form a cloud point depressant that may be added to a distillate fuel such as diesel, biodiesel, or blends of diesel and biodiesel.

EXAMPLES

Example 1: Synthesis of OMAC

Polymerization of an alpha olefin with maleic anhydride produces an OMAC. An alpha olefin having chain length distribution $C_{20}$-$C_{24}$ (1 mol), was charged to a reactor under nitrogen sweep and heated to 70° C. for 15 min. Maleic anhydride (1.1 mol) was added to the alpha olefin, and the reactor was heated to 70° C. for 15 min while mixing the reactants into a homogenous mixture before raising the temperature to 140° C. The initiator catalyst, tertiary-butylperbenzoate, was added to and stirred into the mixture (5.83 g, 0.03 mol) in 5 shots in 30 min intervals for a total reaction time of 2.5 hrs. Fourier-transform infrared spectroscopy (FTIR) monitoring of the maleic anhydride may be used to check the completion of the reaction.

Example 2: Cloud Point Depressant Using N,N-Dimethylcocoamine

In a typical polymerization, 80 g of maleic anhydride (0.82 moles) and about 303 g of alpha-olefin (0.65 to 0.82 moles depending on average molecular weight of the alpha olefin; $C_{12}$ to $C_{30}$) were heated to 65-80° C. in a four-necked round bottom flask to completely melt the reactants while stirring under nitrogen sweep. Once all materials were melted, nitrogen sweep was continued for additional 15 mins while maintaining the temperature at 65 to 80° C. The mixture was then heated further to 140° C. with continuous supply of nitrogen. Tertiary-butylperbenzoate in 1:1 (by weight) hydrocarbon solvent (Exxsol D80) was used as the initiator. The initiator solution was prepared by mixing 1.64 g of tertiary-butylperbenzoate (0.0084 moles) with equal amounts by weight of the solvent. The initiator solution was introduced in the reaction mixture in five equal shots (about 720 µl per shot) to control the temperature as the initiation reaction is exothermic. The first shot was introduced once the mixture had reached the desired temperature of 140° C. The succeeding shots were introduced every 30 minutes to give a total reaction time of 2.5 hours. During the course of the polymerization, the reaction temperature was not allowed to exceed 165° C. The reaction gave a light brown to brown viscous alpha olefin maleic anhydride copolymer (AOMA).

The polymer (AOMA) was further modified in the same reaction vessel by reacting equimolar amount of N,N-dimethylcocoamine based on number of moles of maleic anhydride in the presence or absence of a catalyst ($NaNH_2$). The reaction was carried out at the same temperature (140° C.). The N,N-dimethylcocoamine was added in small portions to avoid significant exotherm and foaming, especially during the initial stage of amine addition. Once all amine had been added, the reaction was allowed to react for 2.5 hours to afford a dark viscous product.

The product was then formulated with ethylene glycol methyl butyl ether (EGMBE) and Nalco Champion EC2043A demulsifier. The final product contained 50% active polymer, 2% Nalco Champion EC2043A and 48% EGMBE as solvent.

The use of EGMBE afforded a stable product that does not lead to phase separation during prolonged storage. Nalco Champion EC2043 on the other hand minimizes the product's propensity to cause emulsion in diesel fuel per ASTM D7451 test.

Table 1 summarizes the physical properties of winter grade ultra low sulfur diesel (ULSD) samples including their initial cold flow properties before any additive treatment. The cloud point of these fuels ranged from 13 to 19° F.

TABLE 1

Physico-chemical properties of middle distillate fuels.

| Properties | Fuel A | Fuel B | Fuel C | Fuel D | Fuel E | Fuel F |
|---|---|---|---|---|---|---|
| Sulfur, ppm | 6 | 4 | 5 | 5 | 8 | 2 |
| Cloud point, ° F. | 18.9 | 16.8 | 14.7 | 13.2 | 14.2 | 17.0 |
| Pour point, ° F. | 10 | 0 | 5 | 10 | 5 | 5 |

Figure 2:
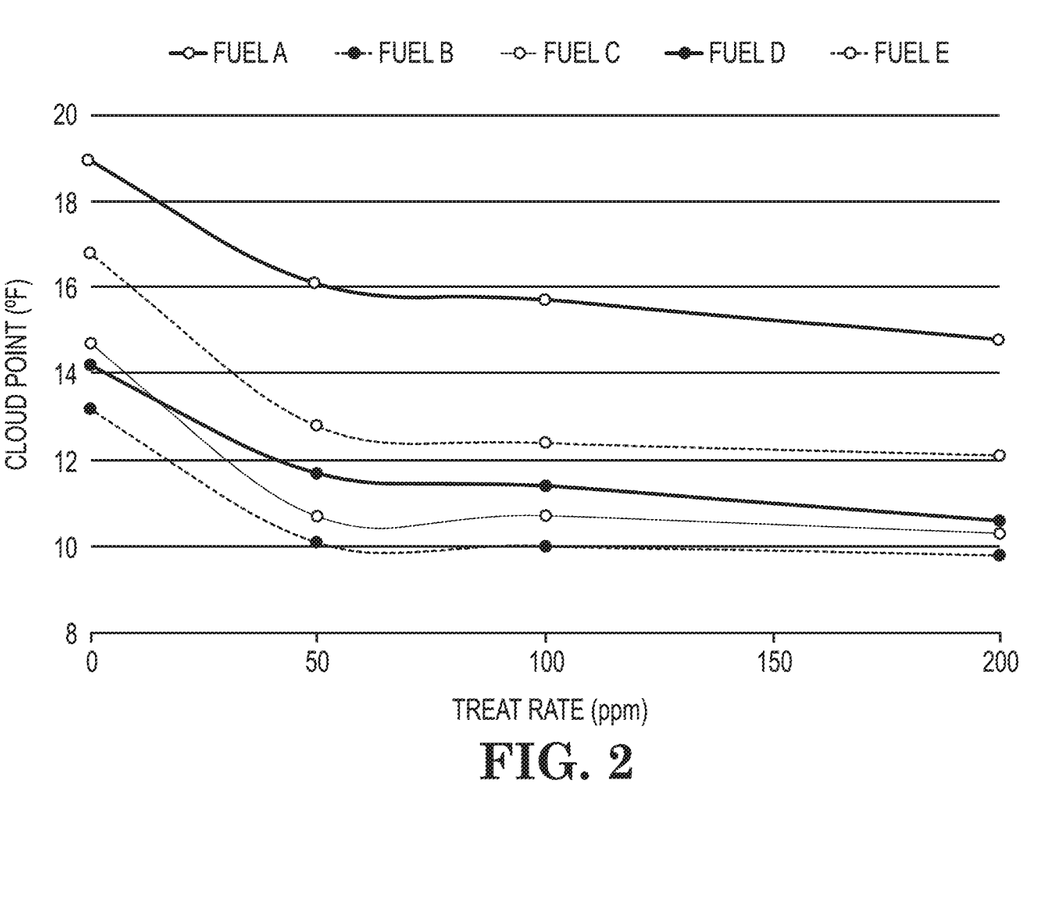
FIG. 2 graphically illustrates the improvement in cloud point measurements of different fuel samples treated with a disclosed cloud point depressant in a range of 50-200 ppm.

FIG. 2 shows the impact of the formulated N,N-dimethylcocoamine-containing polymer (50% active polymer) in improving the cloud point of 5 different ULSD samples, Fuels A-E, per ASTM D5773 procedure. The cloud point formulation provided a 3 to 5° F. improvement upon treatment with 50 to 200 ppm of the additive corresponding to 25 to 100 ppm active polymer material. This clearly shows that the formulated copolymer showed cloud point depressant activity in a variety of winter grade diesel regardless of the fuel's initial cloud point.

Figure 3:
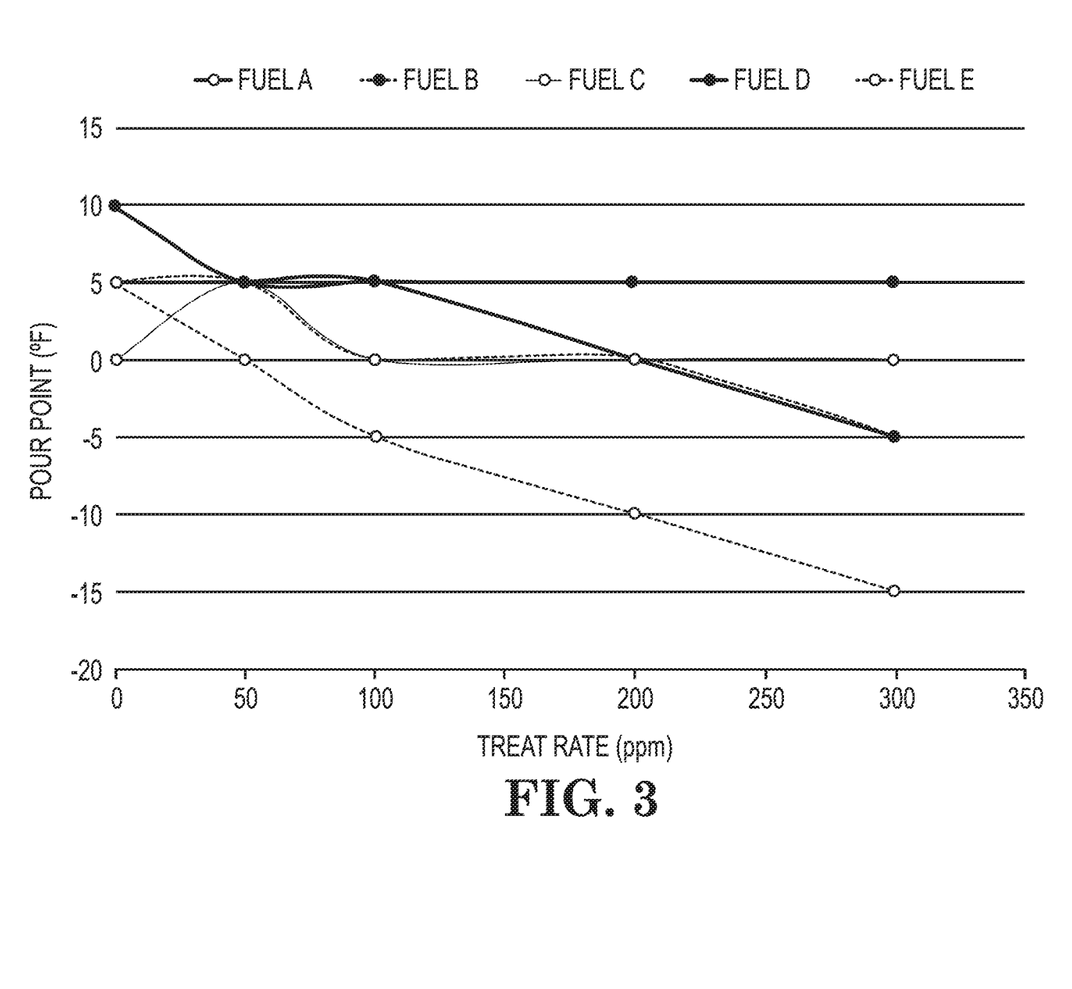
FIG. 3 graphically illustrates the pour point measurements of different fuel samples treated with a disclosed cloud point depressant in a range of 50-300 ppm.

In another experiment, the pour points for Fuels A-E treated with a reaction product of a maleic anhydride/alpha olefin copolymer and N,N-dimethylcocoamine were determined. FIG. 3 shows the same reaction product exhibited pour point depressant actively for only one of the five Fuels A-E.

Example 3: Cloud Point Depressant Using N,N-Dimethyloctadecyl Amine

Figure 4:
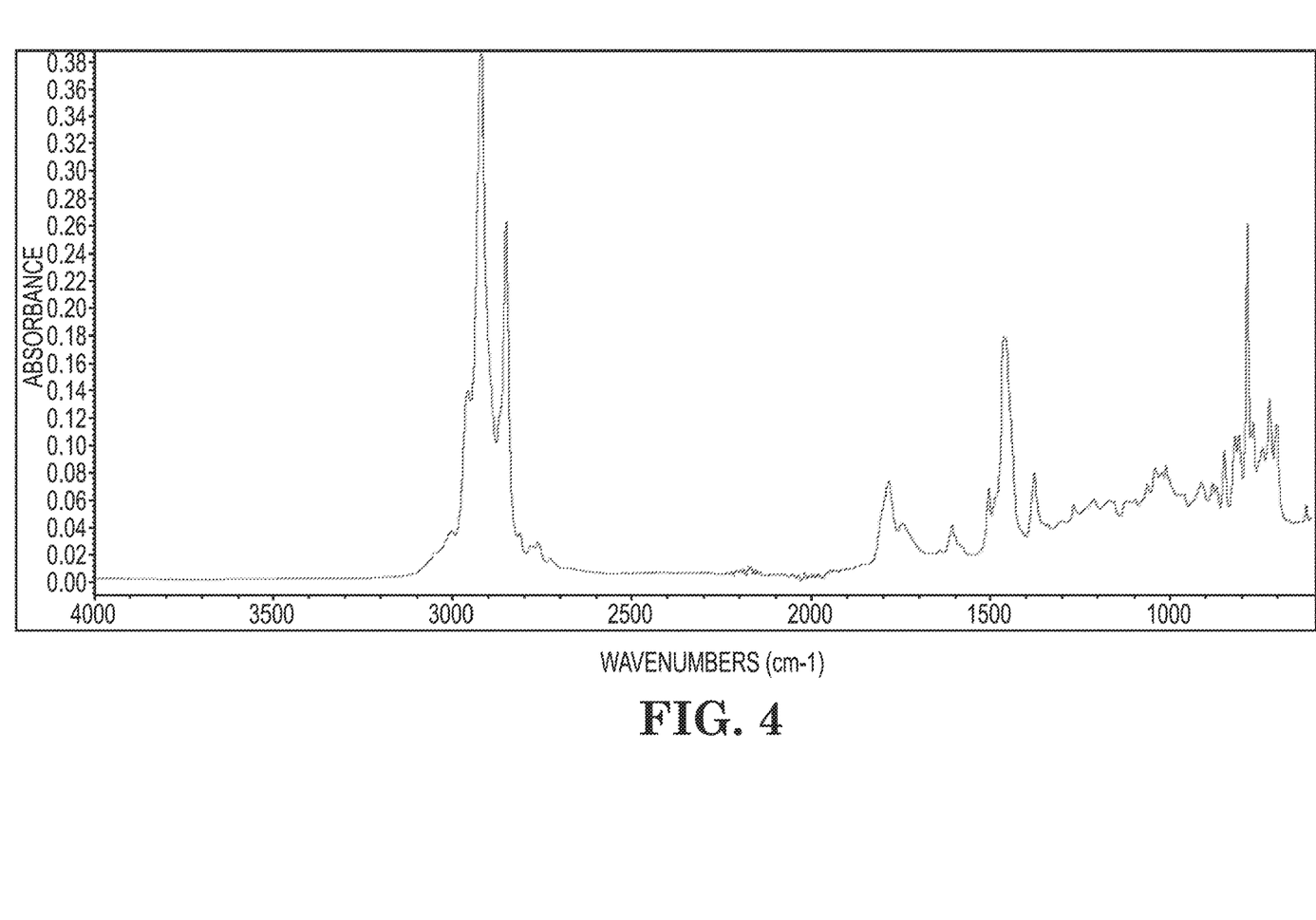
FIG. 4 is an infrared spectrum of a cloud point depressant having an alpha olefin/maleic anhydride copolymer and a $C_{18}$ tertiary amine of the present disclosure.

To evaluate the impact of the alkyl chain length of the tertiary amine, N,N-dimethyloctadecyl amine was used in a cloud point depressant instead of N,N-dimethylcocoamine. The synthesis was conducted following the procedure described in Examples 1 and 2 above, which involved radical polymerization of $C_{20}$-$C_{24}$ alpha olefin and maleic anhydride at 140° C. followed by further modification with N,N-dimethyloctadecyl amine at the same temperature (1:1:1 molar ratio). The final product was further diluted with heavy aromatic naphtha to afford a 50% active polymer. The reaction was confirmed by FT-IR showing a shift in the anhydride carbonyl stretch at 1779 and 1859 $cm^{-1}$ found in the AOMA co-polymer backbone to 1746 and 1784 $cm^{-1}$ upon addition of N,N-dimethyloctadecyl amine. The FT-IR spectra is illustrated in FIG. 4. This shift in carbonyl stretch is consistent with the carbonyl stretch of N,N-dimethylcocoamine illustrated in FIG. 5, described below in comparative Example 2.

The cloud point performance of N,N-dimethyloctadecyl amine was compared with the reaction product derived from of N,N-dimethylcoco amine using two different winter ULSD, Fuels E and F per ASTM D5773 at treat rates ranging from 50 to 200 ppm. The two products exhibited the same performance in these fuels as shown in Table 2. This further confirms that the use of long chain tertiary amines resulted in cloud point improvement and that the performance of the product is not affected by the chain length of the amine from $C_{12}$ to $C_{18}$.

TABLE 2

Impact of chain length of the tertiary amines on the performance of the additive as cloud point depressant.

| | Cloud Point, ° F. | | | |
|---|---|---|---|---|
| | FUEL E | | FUEL F | |
| Treat Rate, ppm | dimethyl-coco amine | dimethyl-octadecyl amine | dimethyl-coco amine | dimethyl-octadecyl amine |
| 0 | 14.2 | 14.2 | 17.0 | 17.0 |
| 50 | 11.7 | 11.4 | 13.3 | 13.4 |
| 100 | 11.4 | 10.6 | 13.1 | 13.4 |
| 200 | 10.6 | 9.8 | 12.7 | 12.9 |

Example 4: Cloud Point Depressant Using Citraconic Anhydride/Alpha Olefin Copolymer Following the procedures of Examples 1 and 2 above, a cloud point depressant was made using a where citraconic anhydride is used in place of maleic anhydride. This cloud point depressant was formulated as described above in Example 2 and then added to Fuels A-E. Table 3 shows the impact of the formulated citraconic anhydride/alpha olefin copolymer (50% active) in improving the cloud point of 5 different fuel samples per ASTM D5773. The cloud point formulation provided an improvement upon treatment with 50 ppm and 100 ppm of the additive corresponding to 25 to 50 ppm active citraconic anhydride/alpha olefin copolymer. This clearly shows that the formulated copolymer showed cloud point depressant activity in a variety of fuels regardless of the fuel's initial cloud point.

TABLE 3

Impact of additives derived from citraconic anhydride/alpha olefin copolymer with N,N-dimethylcocoamine.

| Treat Rate, | Fuel Samples | | | | |
|---|---|---|---|---|---|
| ppm | A | B | C | D | E |
| 0 | 19.0 | 16.8 | 14.7 | 13.2 | 14.2 |
| 50 | 18.1 | 15.6 | 12.8 | 10.9 | 13.5 |
| 100 | 17.2 | 14.8 | 12.4 | 11.1 | 12.8 |

Comparative Example 1

The initial performance screening was conducted using four different samples of ultra low sulfur diesel (ULSD). The diesel samples were treated with different additives synthesized in the laboratory. The synthesis was carried out following the same procedure described previously. The backbone alpha olefin-maleic anhydride (AOMA) co-polymer was prepared via radical polymerization using $C_{20}$-$C_{24}$ alpha olefin followed by further modification along the maleic anhydride moieties with oleyl amine, tallow amine, hydrogenated tallow amine, diethanol oleamide or N,N-dimethyl amine (Table 4a). The additives were then diluted with heavy aromatic naphtha to afford a formulation containing 50% active polymer. The diesel samples were then treated with 200 ppm (based on final formulation) of the additives and the initial screening were conducted per ASTM D5773 (Table 4b).

AOMA co-polymers modified with fatty alcohols and amines are well known cold flow improvers and are well accepted in the industry. Table 4b clearly shows that in general, the performance of these types of additives could be improved by using tertiary amine in further modification of AOMA co-polymers.

TABLE 4a

Additives synthesized with different amines.

| Additives | Further AOMA Modification |
|---|---|
| A | Oleyl amine |
| B | Tallow amine |
| C | Hydrogenated tallow amine |
| D | Diethanol oleamide |
| E | N,N-dimethylcoco amine |

TABLE 4b

Additives initial performance screening at 200 ppm using 4 different fuels in terms of cloud point improvement per ASTM D5773.

| Additive | ULSD A | ULSD B | ULSD C | ULSD E |
|---|---|---|---|---|
| Untreated | 22.7 | 10.7 | 7.5 | 2.1 |
| A | 17.4 | 6.3 | 2.3 | −3.5 |
| B | 17.4 | 6.5 | 1.5* | −3.7 |
| C | 16.5 | 8.5 | 4.7 | −0.9 |
| D | 17.8 | 6.6 | 3.1 | −3.8 |
| E | 16.4* | 6.1* | 1.7 | −4.1* |

*Best cloud point performance

Comparative Example 2

Figure 5:
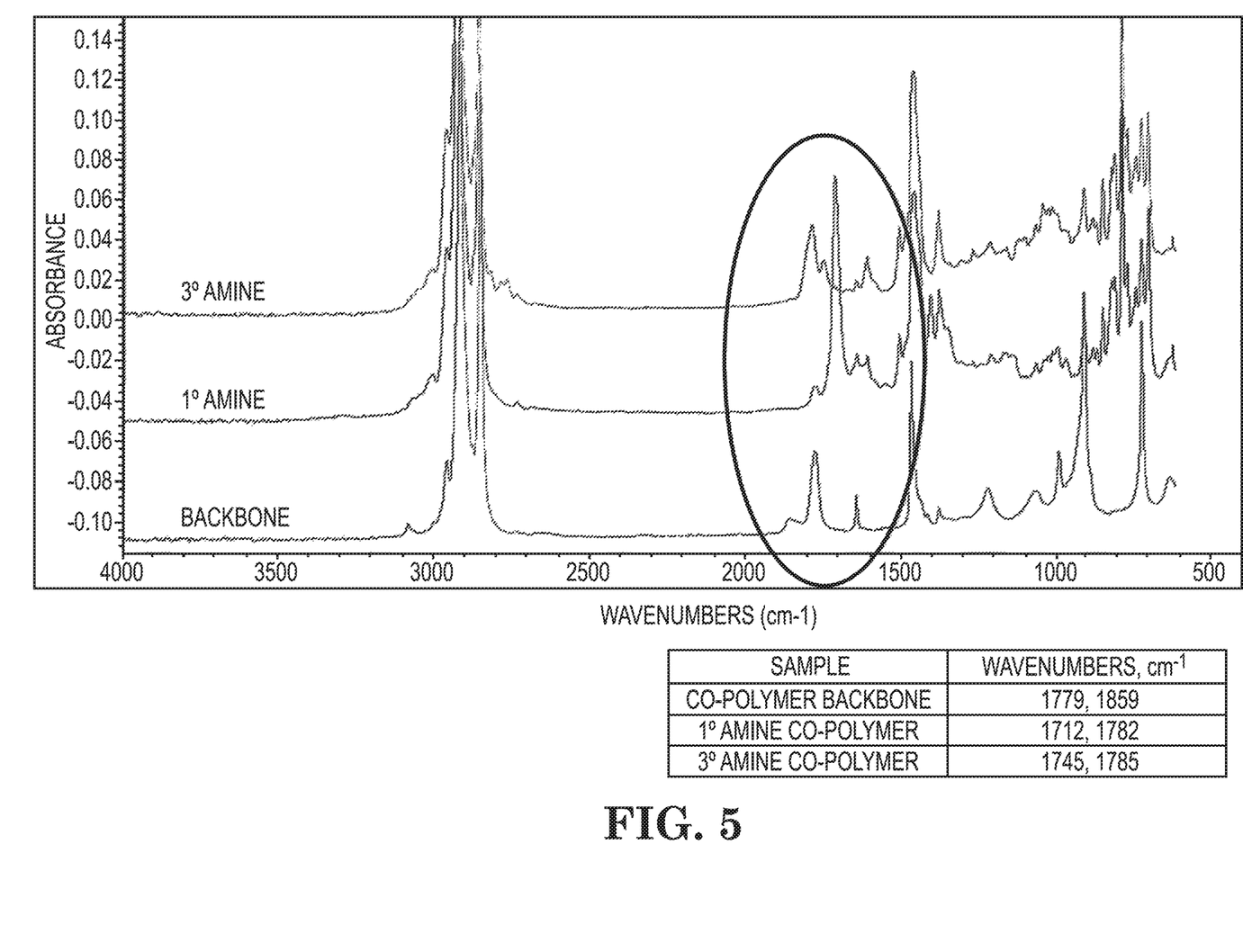
FIG. 5 is an infrared spectrum comparing a reaction product of an alpha olefin/maleic anhydride copolymer and a tertiary amine and a reaction product of an alpha olefin/maleic anhydride copolymer and a primary amine.

Following the procedure of Example 2, above, a maleic anhydride/alpha olefin $C_{20}$-$C_{24}$ copolymer was used to form a reaction product with two different amines; tallow amine (a mixture of $C_{16}$ and $C_{18}$ primary amine) and N,N-dimethylcocoamine (a dimethyl $C_{12}$ tertiary amine). FIG. 5, an infrared spectrum of the two reaction products, show obvious differences between the infrared spectrum the reaction product formed with a primary amine (middle spectrum, anhydride carbonyl stretch at 1712 and 1782 cm$^{-1}$), the reaction product formed with a tertiary amine (top spectrum, anhydride carbonyl stretch at 1745 and 1785 cm$^{-1}$), and the FT-IR showing a shift in the anhydride carbonyl stretch in the AOMA co-polymer backbone (bottom spectrum, anhydride carbonyl stretch at 1779 and 1859 cm$^{-1}$).

These data show that the structures of the two reaction products are different and the skilled person could not expect or predict the differences in the structures or the properties of the reaction product of a disclosed copolymer and tertiary amine based on the properties of a reaction product of a copolymer and primary amine.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments mentioned herein, described herein and/or incorporated herein. In addition the invention encompasses any possible combination that also specifically excludes any one or some of the various embodiments mentioned herein, described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described in this disclosure which equivalents are also intended to be encompassed by the claims.

All percentages, ratios and proportions in this disclosure are by weight unless otherwise specified. Unless otherwise indicated herein molecular weight or MW refers to molecular weight as measured by weight average.

Those skilled in the art may recognize other equivalents to the specific embodiments described in this disclosure which equivalents are intended to be encompassed by the attached claims.

The invention claimed is:

1. A cloud point depressant for middle distillate fuels and middle distillate fuels blended with biodiesel comprising a reaction product of
   i) a copolymer of an alpha olefin and an unsaturated monomer, and
   ii) a tertiary amine.

2. The cloud point depressant of claim 1, wherein the alpha olefin comprises a $C_8$-$C_{30}$ alpha olefin or mixtures thereof.

3. The cloud point depressant of claim 1, wherein the alpha olefin comprises one or more alpha olefins selected from the group consisting of an alpha olefin of formula (I)

$$R_1-CH=CH_2 \quad (I)$$

wherein R1 is $C_{10}$-$C_{14}$ alkyl;
an alpha olefin of formula (II)

$$R_2-CH=CH_2 \quad (II),$$

wherein $R_2$ is $C_{15}$-$C_{19}$ alkyl,
an alpha olefin of formula (III)

$$R_3-CH=CH_2 \quad (III),$$

wherein R3 is $C_{20}$-$C_{30}$ alky; and combinations thereof.

4. The cloud point depressant of claim 1, wherein the unsaturated monomer comprises one or more monomers selected form the group consisting of a monomer of formula (IV)

wherein $R_1$ is hydrogen or $C_1$-$C_{12}$ alkyl;

a monomer of formula (V)

wherein $R_1$ is hydrogen or $C_1$-$C_{12}$ alkyl and $R_2$ and $R_3$ are the same or different and are $C_1$-$C_{12}$ alkyl;
a monomer of formula (VI)

wherein $R_1$ is hydrogen or $C_1$-$C_{12}$ alkyl $R_4$ is $C_1$-$C_{12}$ alkyl, $C_6$-$C_{12}$ aryl, or $C_6$-$C_{20}$ alkaryl; and combinations thereof.

5. The cloud point depressant of claim 1, wherein the unsaturated monomer comprises maleic anhydride, maleic acid, maleic acid diamides, maleimide, or N-alkyl, N-aryl, and N-alkaryl maleimides.

6. The cloud point depressant of claim 1, wherein the unsaturated monomer comprises citraconic anhydride, citraconic acid, citraconic acid amides, citraconimide, or N-alkyl, N-aryl, and N-alkaryl citraconimides.

7. The cloud point depressant of claim 1 wherein the unsaturated monomer comprises maleic anhydride.

8. The cloud point depressant of claim 1 wherein the unsaturated monomer comprises a combination of maleic anhydride and citronic anhydride.

9. The cloud point depressant of claim 1, wherein the tertiary amine comprises an amine having the formula (VII)

$$N(R_5)(R_6)(R_7) \qquad (VII)$$

wherein $R_5$, $R_6$, and $R_7$ are the same or different and are $C_1$-$C_{30}$ alkyl.

10. The cloud point depressant of claim 1, wherein the tertiary amine comprises an amine having the formula (VIII)

$$N(R_8)(R_9)(R_{10}) \qquad (VIII)$$

wherein $R_8$, $R_9$, and $R_{10}$ are the same or different and are $C_1$-$C_{18}$ alkyl.

11. The cloud point depressant of claim 1, wherein the tertiary amine comprises a dimethyl fatty acid amine or mixtures thereof.

12. The cloud point depressant of claim 1, wherein the alpha olefin is a mixture of $C_{20}$-$C_{24}$ alpha olefins, the unsaturated monomer is maleic anhydride, and the tertiary amine is N,N-dimethylcocoamine.

13. A cloud point depressant comprising the reaction product of i) a copolymer of an alpha olefin and an unsaturated monomer, and ii) a tertiary amine; an organic solvent; and optionally a demulsifier.

14. The cloud point depressant of claim 13, wherein the alpha olefin comprises a $C_8$-$C_{30}$ alpha olefin or mixtures thereof, or wherein the alpha olefin comprises one or more alpha olefins selected from the group consisting of an alpha olefin of formula (I)

$$R_1\text{---CH}\text{==}\text{CH}_2 \qquad (I)$$

wherein R1 is $C_{10}$-$C_{14}$ alkyl;
an alpha olefin of formula (II)

$$R_2\text{---CH}\text{==}\text{CH}_2 \qquad (II),$$

wherein $R_2$ is $C_{15}$-$C_{19}$ alkyl, an alpha olefin of formula (III)

$$R_3\text{---CH}\text{==}\text{CH}_2 \qquad (III),$$

wherein R3 is $C_{20}$-$C_{30}$ alky; and combinations thereof.

15. The cloud point depressant of claim 13, wherein the unsaturated monomer comprises one or more monomers selected form the group consisting of a monomer of formula (IV)

wherein $R_1$ is hydrogen or $C_1$-$C_{12}$ alkyl;
a monomer of formula (V)

wherein $R_1$ is hydrogen or $C_1$-$C_{12}$ alkyl and $R_2$ and $R_3$ are the same or different and are $C_1$-$C_{12}$ alkyl;
a monomer of formula (VI)

wherein $R_1$ is hydrogen or $C_1$-$C_{12}$ alkyl $R_4$ is $C_1$-$C_{12}$ alkyl, $C_6$-$C_{12}$ aryl, or $C_6$-$C_{20}$ alkaryl; or combinations thereof.

16. The cloud point depressant of claim 13, wherein the organic solvent comprises $C_1$-$C_{12}$ alkyl ethers, $C_5$-$C_{18}$ linear alkanes, $C_5$-$C_{18}$ branched alkanes, $C_5$-$C_8$ cycloalkanes, toluene, o-xylene, m-xylene, p-xylene, refined petroleum solvent, ethylene glycol methyl butyl ether, or any combination thereof.

17. The cloud point depressant of claim 13 comprising about 35-65 wt % reaction product of a i) copolymer of an alpha olefin and an unsaturated monomer, and ii) a tertiary amine; about 33-65 wt % organic solvent; and optionally about 2-10 wt % demulsifier.

18. A fuel composition comprising a fuel and a cloud point depressant of claim 1.

19. A method of lowering the cloud point of a middle distillate fuel or blends of middle distillate fuel and biodiesel comprising applying a cloud point depressant of claim 1 to a fuel composition.

20. The cloud point depressant of claim 13, wherein the tertiary amine comprises an amine having the formula (VII)

$$N(R_5)(R_6)(R_7) \qquad (VII)$$

wherein $R_5$, $R_6$, and $R_7$ are the same or different and are $C_1$-$C_{30}$ alkyl;
wherein the tertiary amine comprises an amine having the formula (VIII)

$$N(R_8)(R_9)(R_{10}) \qquad (VIII)$$

wherein $R_8$, $R_9$, and $R_{10}$ are the same or different and are $C_1$-$C_{18}$ alkyl; or wherein the tertiary amine comprises a dimethyl fatty acid amine or mixtures.

\* \* \* \* \*

UNITED STATES PATENT AND TRADEMARK OFFICE
CERTIFICATE OF CORRECTION

PATENT NO. : 10,941,366 B2
APPLICATION NO. : 16/233318
DATED : March 9, 2021
INVENTOR(S) : Soriano, Jr. et al.

Page 1 of 1

It is certified that error appears in the above-identified patent and that said Letters Patent is hereby corrected as shown below:

On the Title Page

Item (56), Column 2, Other Publications, Line 1, "Ke-Dian" should be --Ke-Jian--, therefor.

In the Claims

Column 12, Claim 3, Line 45, "R1" should be --$R_1$--, therefor.

Column 12, Claim 3, Line 53, "R3" should be --$R_3$--, therefor.

Column 12, Claim 3, Line 53, "alky;" should --alkyl;--, therefor.

Column 13, Claim 14, Line 63, "R1" should be --$R_1$--, therefor.

Column 14, Claim 14, Line 4, "R3" should be --$R_3$--, therefor.

Column 14, Claim 14, Line 4, "alky;" should be --alkyl--, therefor.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*